United States Patent
Teh et al.

(10) Patent No.: US 11,719,855 B2
(45) Date of Patent: Aug. 8, 2023

(54) VOLUMETRIC WELL PRODUCTION USER INTERFACE COMPONENTS

(71) Applicant: Schlumberger Technology Corporation, Sugar Land, TX (US)

(72) Inventors: Siau Ban Teh, Menlo Park, CA (US); Andrey Konchenko, Menlo Park, CA (US); Sergey Doronichev, Menlo Park, CA (US); Tong Zhang, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1187 days.

(21) Appl. No.: 16/203,609

(22) Filed: Nov. 29, 2018

(65) Prior Publication Data

US 2020/0174157 A1 Jun. 4, 2020

(51) Int. Cl.
| | | |
|---|---|---|
| *G01V 99/00* | (2009.01) | |
| *G06T 17/05* | (2011.01) | |
| *G06T 13/60* | (2011.01) | |
| *G01V 1/48* | (2006.01) | |
| *G06T 13/20* | (2011.01) | |

(52) U.S. Cl.
CPC .............. *G01V 99/005* (2013.01); *G01V 1/48* (2013.01); *G06T 13/60* (2013.01); *G01V 2210/74* (2013.01); *G06T 13/20* (2013.01); *G06T 17/05* (2013.01)

(58) Field of Classification Search
CPC ...... G01V 99/05; G01V 1/48; G01V 2210/74; G06T 13/20; G06T 13/60; G06T 15/08; G06T 17/05; E21B 49/08; E21B 47/008
See application file for complete search history.

(56) References Cited

U.S. PATENT DOCUMENTS

| | | | |
|---|---|---|---|
| 6,772,066 B2 | 8/2004 | Cook | |
| 7,190,365 B2 * | 3/2007 | Fleury | G06F 3/04815 |
| | | | 345/648 |
| 8,566,749 B2 * | 10/2013 | Kashik | G06F 3/04815 |
| | | | 715/848 |

(Continued)

FOREIGN PATENT DOCUMENTS

| | | | | |
|---|---|---|---|---|
| WO | WO-2010053618 A1 * | 5/2010 | ............. | E21B 44/00 |
| WO | 2012/018429 A1 | 2/2012 | | |

(Continued)

OTHER PUBLICATIONS

Mao, Debin et al., Detailed analysis of petroleum hydrocarbon attenuation in biopiles by high-performance liquid chromatography followed by comprehensive two-dimensional gas chromatography, 2009, Journal of Chromatography, A. 1216., 1524-1527. (Year: 2009).*

(Continued)

*Primary Examiner* — Akash Saxena
(74) *Attorney, Agent, or Firm* — Jeffrey D. Frantz

(57) ABSTRACT

Methods, apparatuses, and computer-readable media are set forth for visualizing and interacting with well production data in a three-dimensional or four-dimensional environment, e.g., using a volumetric well production display representation representing a well in an oilfield and including a plurality of display characteristics configured to display historical production data for the well over a time period.

18 Claims, 6 Drawing Sheets

(56) References Cited

U.S. PATENT DOCUMENTS

| | | | |
|---|---|---|---|
| 10,584,570 B2* | 3/2020 | Cheng | E21B 43/30 |
| 10,670,753 B2* | 6/2020 | de Matos Ravanelli | G01V 1/305 |
| 2002/0067373 A1* | 6/2002 | Roe | G06T 17/05 |
| | | | 715/762 |
| 2003/0233194 A1* | 12/2003 | Cook | G01V 1/34 |
| | | | 702/16 |
| 2007/0213935 A1* | 9/2007 | Fagnou | G01V 1/34 |
| | | | 702/6 |
| 2009/0043507 A1* | 2/2009 | Dommisse | G01V 1/34 |
| | | | 702/6 |
| 2010/0088082 A1* | 4/2010 | Ingham | E21B 41/00 |
| | | | 703/10 |
| 2010/0206559 A1* | 8/2010 | Sequeira, Jr. | G01V 99/00 |
| | | | 166/250.15 |
| 2011/0175899 A1* | 7/2011 | Bittar | G01V 1/34 |
| | | | 345/419 |
| 2012/0188236 A1* | 7/2012 | Legendre | E21B 47/002 |
| | | | 345/419 |
| 2012/0290211 A1* | 11/2012 | Murphy | E21B 47/00 |
| | | | 702/13 |
| 2015/0104767 A1* | 4/2015 | Robineau | G06T 17/05 |
| | | | 434/219 |
| 2016/0245065 A1* | 8/2016 | Gray | G01V 1/306 |
| 2019/0025461 A1* | 1/2019 | Wiener | G01V 99/005 |
| 2020/0174157 A1* | 6/2020 | Teh | G01V 1/48 |

FOREIGN PATENT DOCUMENTS

| | | | | |
|---|---|---|---|---|
| WO | WO-2012018429 A1 * | 2/2012 | | E21B 43/12 |
| WO | WO-2013134338 A1 * | 9/2013 | | G06T 13/20 |
| WO | WO-2015171799 A1 * | 11/2015 | | E21B 43/00 |

OTHER PUBLICATIONS

International Preliminary Report on Patentability dated May 25, 2021 for the equivalent PCTUS2019063237 (8 pages).

International Search Report and Written Opinion for the counterpart International patent application PCT/US2019/063237 dated Mar. 17, 2020.

* cited by examiner

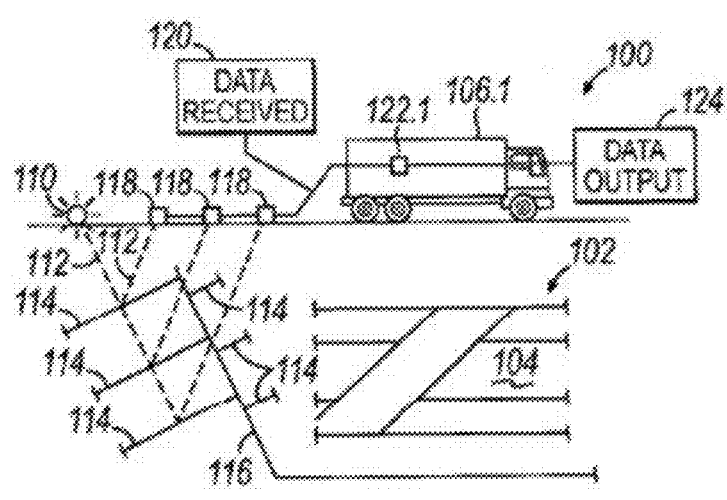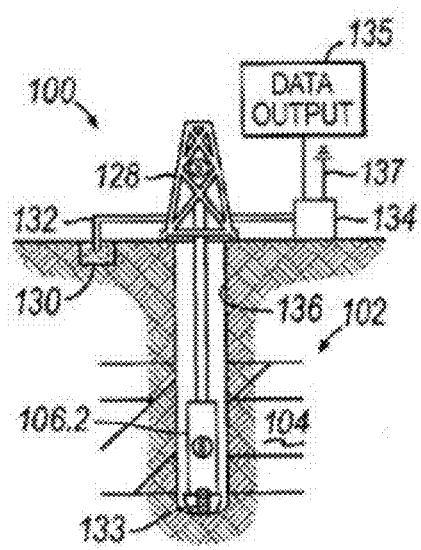
FIG. 1.1　　　　　　　　　FIG. 1.2
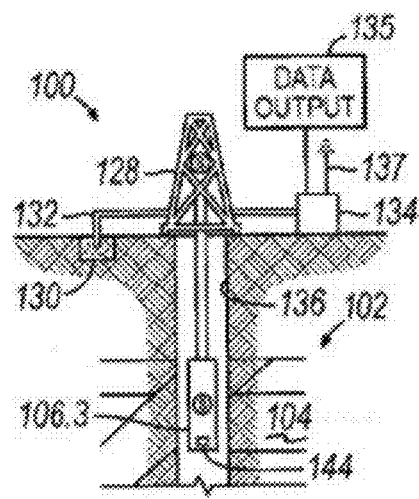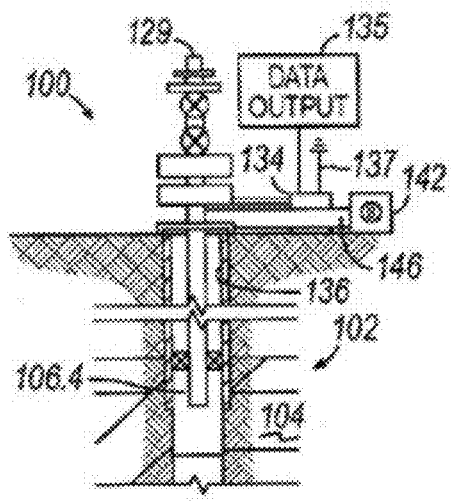
FIG. 1.3　　　　　　　　　FIG. 1.4

VOLUMETRIC WELL PRODUCTION USER INTERFACE COMPONENTS

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. Visualization and interaction with such data is further complicated by the volume and complexity of such data, and as a result, a significant need exists for improvements in visualization and interaction with oil and gas data.

SUMMARY

Methods, apparatuses, and computer-readable media are set forth for visualizing and interacting with well production data in a three-dimensional or four-dimensional environment, e.g., using a volumetric well production display representation representing a well in an oilfield and including a plurality of display characteristics configured to display historical production data for the well over a time period.

Therefore, consistent with one aspect of the invention, a method may include generating a volumetric display representation of an oilfield, and generating within the volumetric display representation a volumetric well production display representation representing a well in the oilfield, the well production display representation including a plurality of display characteristics configured to display historical production data for the well over a time period.

In some embodiments, the plurality of display characteristics include one or more of a vertical dimension representing a duration over which the well is active, a horizontal dimension representing a rate of production, where the horizontal dimension at a predetermined height along the vertical dimension represents a rate of production at a predetermined time within the duration, and a plurality of regions representing relative quantities of chemical components in a fluid produced by the well. Also, in some embodiments, the plurality of regions includes regions corresponding to one or more of water, gas, oil, hydrocarbon and hydrocarbon group. Further, in some embodiments, the plurality of regions are distinguished based upon one or more of color, shading, and pattern.

In some embodiments, the display representation has a conical frustum shape, and where each region is generally pie slice-shaped. In addition, in some embodiments, at the predetermined height, each region has an arc length corresponding to a relative quantity of an associated chemical component in a produced fluid produced by the well at the predetermined time. In some embodiments, the display representation is interactive and is configured to display additional well production information in response to user input directed to the display representation.

Some embodiments may also include generating within the volumetric display representation a volumetric well trajectory representation corresponding to a well trajectory of the well. In some embodiments, the well trajectory representation includes at least one display representation representing a perforation, completion or inflow control device of the well. In addition, in some embodiments, the volumetric display representation of the oilfield represents a surface, and the well trajectory representation is displayed below the surface within a subsurface region. Moreover, in some embodiments, generating the volumetric well trajectory representation includes generating an animation that elevates the oilfield.

In some embodiments, generating the volumetric well trajectory representation is performed in response to user input to show a subsurface. Moreover, in some embodiments, the user input is a voice input. Some embodiments may also include displaying the volumetric display representation of the oilfield and the volumetric well production display representation with a three-dimensional display, a virtual reality display or an augmented reality display.

Some embodiments may also include an apparatus including one or more processors and program code configured upon execution by the one or more processors to perform any of the methods discussed herein. Some embodiments may also include a program product including a computer readable medium and program code stored on the computer readable medium and configured upon execution by one or more processors to perform any of the methods discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

DETAILED DESCRIPTION OF THE INVENTION

Figure 2:
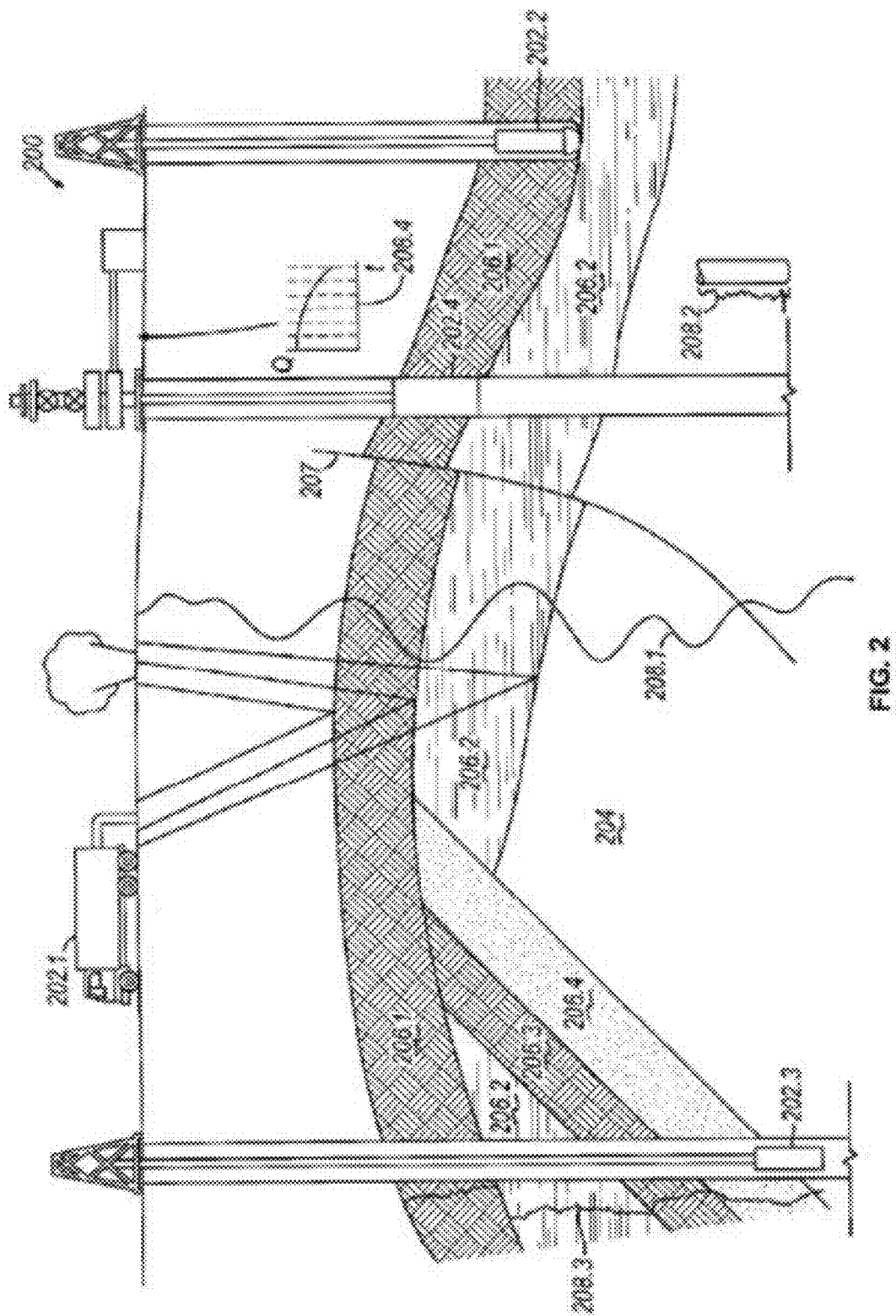
FIG. 2 illustrates a schematic view, partially in cross section of an oilfield having a plurality of data acquisition tools positioned at various locations along the oilfield for collecting data from the subterranean formations in accordance with one or more embodiments.

The embodiments discussed hereinafter implement a number of different three dimensional user interface components for facilitating the visualization of and/or interaction with well production data. Prior to a discussion of these techniques, however, an overview of oilfield operations is provided, as is an example hardware and software environment within which the herein-described concepts may be implemented.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

Oilfield Operations

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
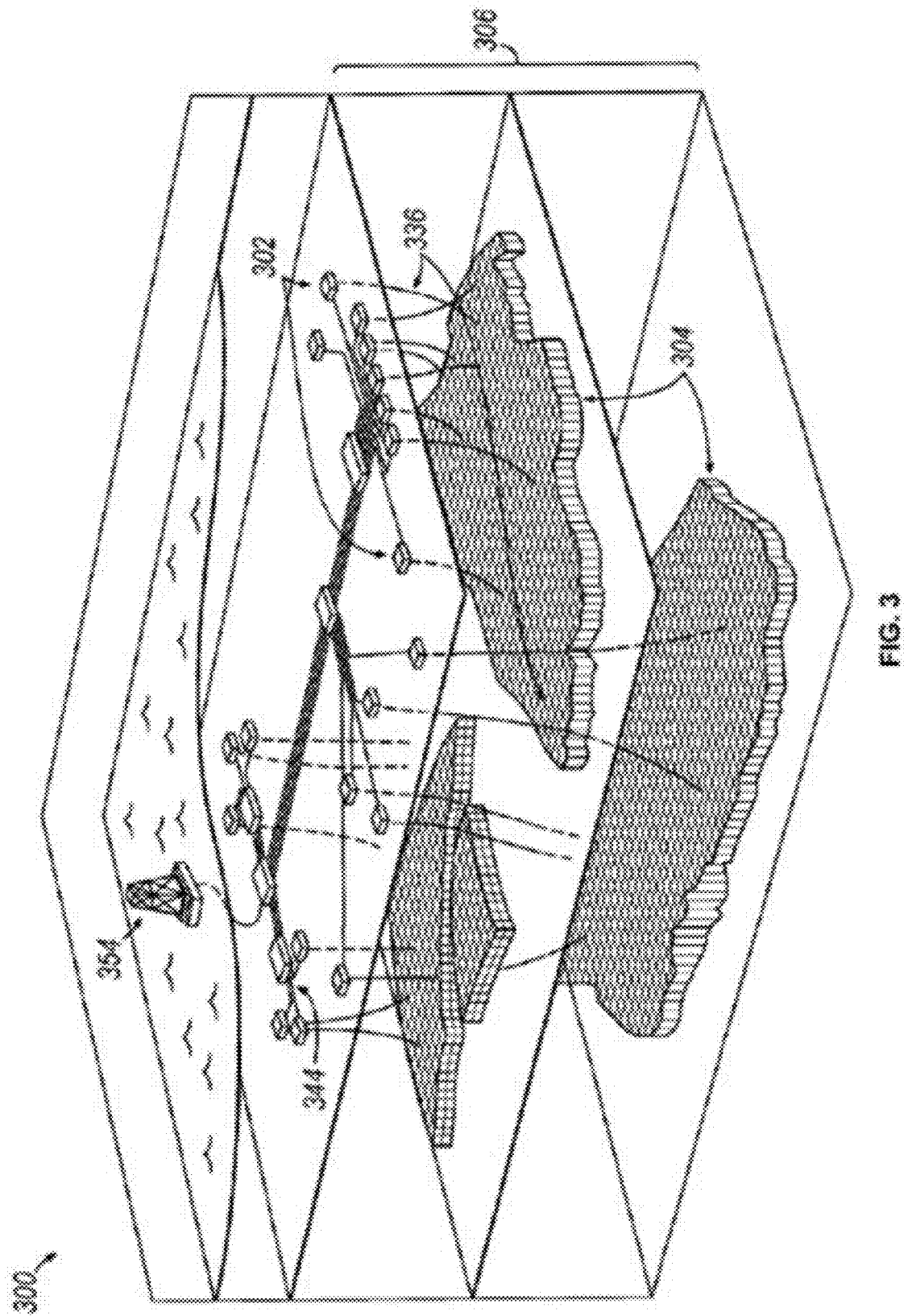
FIG. 3 illustrates a production system for performing one or more oilfield operations in accordance with one or more embodiments.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Hardware and Software Environment

Figure 4:
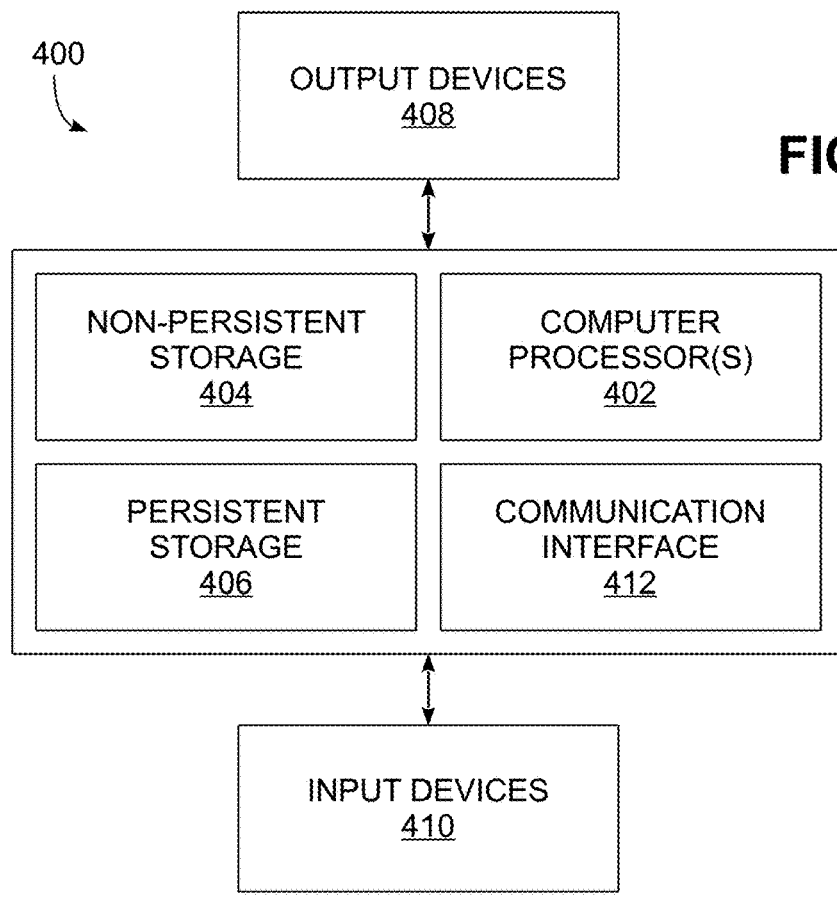
FIG. 4 illustrates an example computing system that can implement the various functions and features described herein.

Embodiments may be implemented on a computing system. Any combination of mobile, desktop, server, router, switch, embedded device, or other types of hardware may be used. For example, as shown in FIG. 4, the computing system 400 may include one or more computer processors 402, non-persistent storage 404 (e.g., volatile memory, such as random access memory (RAM), cache memory), persistent storage 406 (e.g., a hard disk, an optical drive such as a compact disk (CD) drive or digital versatile disk (DVD) drive, a flash memory, etc.), a communication interface 412 (e.g., Bluetooth interface, infrared interface, network interface, optical interface, etc.), and numerous other elements and functionalities.

The computer processor(s) 402 may be an integrated circuit for processing instructions. For example, the computer processor(s) may be one or more cores or micro-cores of a processor. The computing system 400 may also include one or more input devices 410, such as a touchscreen, keyboard, mouse, microphone, touchpad, electronic pen, or any other type of input device.

The communication interface 412 may include an integrated circuit for connecting the computing system 400 to a network (not shown) (e.g., a local area network (LAN), a wide area network (WAN) such as the Internet, mobile network, or any other type of network) and/or to another device, such as another computing device.

Further, the computing system 400 may include one or more output devices 408, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 402, non-persistent storage 404, and persistent storage 406. Many different types of computing systems exist, and the aforementioned input and output device(s) may take other forms.

Furthermore, it will be appreciated that in some embodiments, computing system 400 may support virtual reality (VR) and/or augmented reality (AR) inputs and outputs, e.g., VR and/or AR headsets and/or wearable computers and the like. In addition, in some instances, computing system 400 may support a holographic or other three-dimensional or four-dimensional display. Moreover, computing system 400 may support a shared workspace whereby multiple users, potentially using separate VR and/or AR-compatible computing systems, may view and/or interact with the same data in a shared virtual environment.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 5:
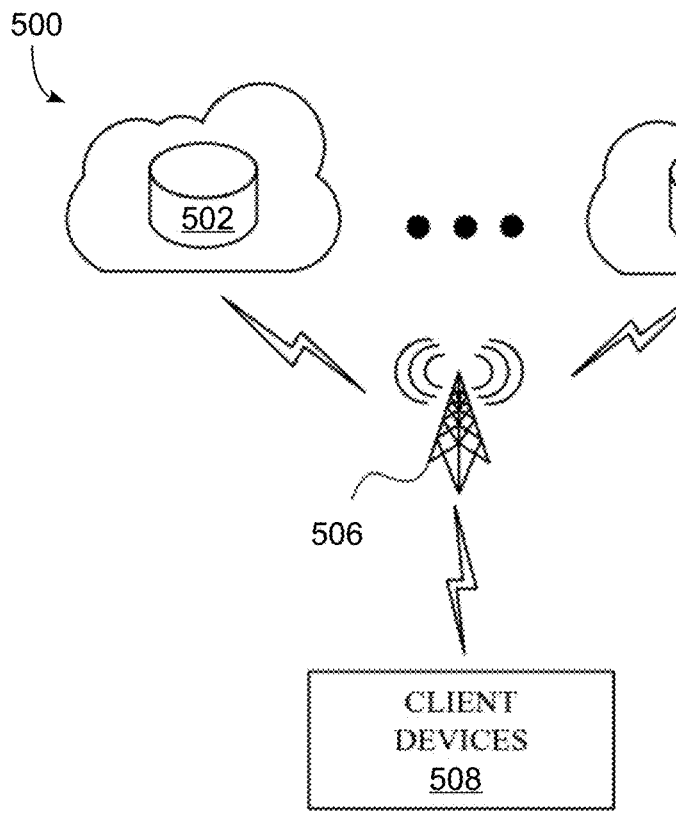
FIG. 5 illustrates an example network that can implement the various functions and features described herein.

The computing system 400 in FIG. 4 may be connected to or be a part of a network, such as the network 506 described by system 500 of FIG. 5. For example, as shown in FIG. 5, the network 506 may include multiple nodes (e.g., node X 502, node Y 504). Each node may correspond to a computing system, such as the computing system shown in FIG. 4, or a group of nodes combined may correspond to the computing system shown in FIG. 4. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 400 may be located at a remote location and connected to the other elements over a network.

Although not shown in FIG. 5, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 502, node Y 504) in the network 506 may be configured to provide services for a client device

508. For example, the nodes may be part of a cloud computing system. The nodes may include functionality to receive requests from the client device 508 and transmit responses to the client device 508. The client device 508 may be a computing system, such as the computing system shown in FIG. 4. Further, the client device 508 may include and/or perform all or a portion of one or more embodiments.

The computing system or group of computing systems described in FIGS. 4 and 5 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 4 and the nodes and/or client device in FIG. 5. Other functions may be performed using one or more embodiments.

Those skilled in the art will recognize that the example environment illustrated in FIGS. 4 and 5 is not intended to limit the invention. Indeed, those skilled in the art will recognize that other alternative hardware and/or software environments may be used without departing from the scope of the invention.

Three Dimensional Well Production User Interface Components

As noted above, one challenge in the oil & gas industry is related to the visualization and digestion of large amounts of well production data that may be available to engineers and other technical personnel. A given oilfield, for example, may have tens or hundreds of wells, with each well potentially having multiple perforations, completions, inflow control devices (ICDs), etc. Further both production and injection wells may be present in some oilfields, as may a surface network that collects, transports and/or processes recovered hydrocarbons. Over time, the production characteristics of each well may vary, and it may be desirable to monitor and assess these historical production characteristics in order to assess results, predict future production and/or make production-related decisions.

Embodiments consistent with the invention may address these and other challenges through the use of one or more volumetric user interface components or display representations configured to better facilitate visualization and interaction with well production and/or other oil & gas data.

A volumetric user interface component or display representation, in this regard, may be considered to be an object rendered as a volume in a three-dimensional environment (or four-dimensional environment where the fourth dimension is time) to display information and/or interact with a user (e.g., via receiving user input directed to the user interface component). In some embodiments, a three-dimensional or four-dimensional environment may be rendered on a two-dimensional display, e.g., a monitor, a smartphone, tablet, or other mobile device, while in other embodiments, a three-dimensional or four-dimensional environment may be rendered on a holographic or other three-dimensional or four-dimensional display, or on a wearable display such as a VR and/or AR headset.

Figure 6A:
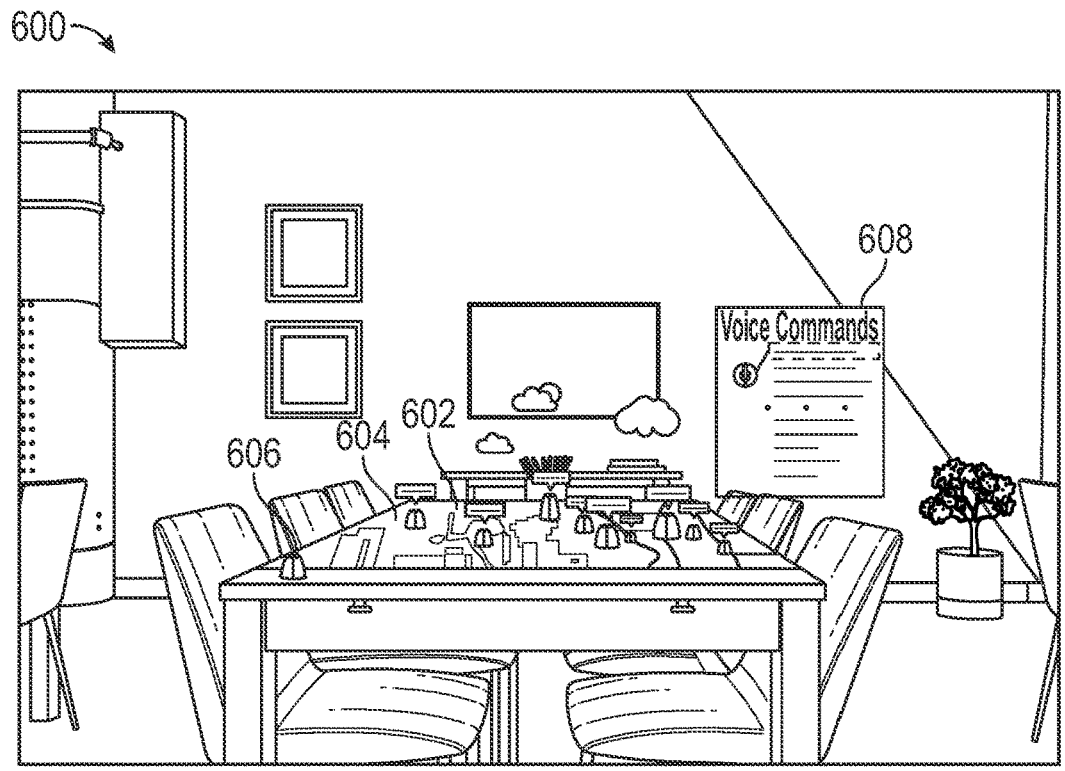
FIGS. 6A-6B illustrate an example volumetric display representation of an oilfield in accordance with implementations of various technologies and techniques described herein, with a subsurface thereof hidden (FIG. 6A) and shown (FIG. 6B).

FIG. 6A, for example, illustrates an example three-dimensional environment 600 rendered on a physical tabletop 602 in an augmented reality implementation, e.g., as might be displayed in an AR headset or an AR-capable mobile device. Environment 600 may include a rendering of an oilfield 604, which may include satellite photography in some embodiments, and which may be rendered either in a plane or in a three-dimensional relief map in some embodiments. Oil wells in oilfield 604 are rendered at locations corresponding to the physical surface locations of the oil wells in the oilfield using volumetric well production display representations 606, which as will be discussed in greater detail below, may include multiple controllable display characteristics to provide detailed production history information in a particularly intuitive manner.

Additional information may also be displayed in environment 600, e.g., labels corresponding to each display representation 606, additional graphical and/or textual information describing the oilfield and/or individual wells, and even a voice menu 608 that may provide a user with suitable voice commands that the user may utter to interact within the environment (e.g., show/hide subsurface, show/hide perforations, show/hide horizontal wells, show/hide vertical wells, show/hide start dates, show/hide finish dates, zoom in/out, start/end rotation (of the scene about a vertical axis), and reset scene, among others.

Figure 6B:
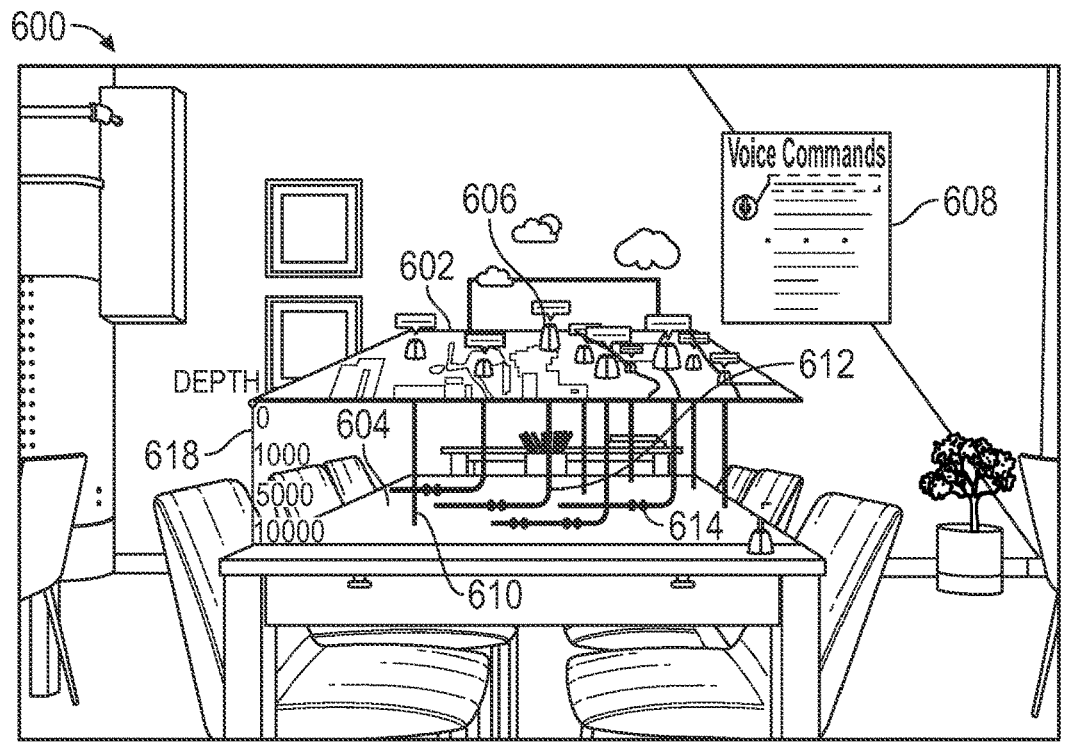

One particular interaction that may be supported is showing a subsurface, the result of which is illustrated in FIG. 6B. Upon a request to show the subsurface, which may be initiated via voice, gesture, touchscreen input, keyboard input, or any other appropriate user input, a three-dimensional rendering of the subsurface may be displayed, including well trajectory representations for each well (e.g., well trajectory representation 610, illustrating a well trajectory for a vertical well, and well trajectory representation 612, illustrating a well trajectory for a horizontal well). Additional features of a well may also be displayed in some embodiments, e.g., perforations, completions, ICDs, etc., as represented by display representations 614. In addition, in some embodiments a legend, e.g., a depth scale 618, may be displayed to enable a user to view the depth of each well trajectory. While not required, in some embodiments the display of the subsurface may result in the oilfield rendering 604 being shifted upwardly relative to tabletop 602, and it will be appreciated that an animation may be used to illustrate the transition between a visible and a hidden substrate. In addition, via voice or other commands, individual features of wells may be shown or hidden (e.g., to show/hide perforations, completions, ICDs, horizontal wells, vertical wells, etc.), and a user may also be able to request further details regarding individual features or wells, and be provided the results via spoken and/or visual outputs.

In some embodiments, well trajectory representations 610, 612 may be substantially accurate representations of the actual well trajectories for each well. In other embodiments, however, the representations of the well trajectories may be substantially simplified, e.g., where a user only wishes to distinguish between horizontal and vertical wells.

Figure 7A:
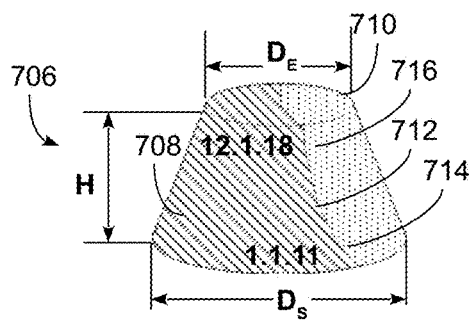
FIG. 7A illustrates an example volumetric well production display representation in accordance with implementations of various technologies and techniques described herein.
Figure 7B:
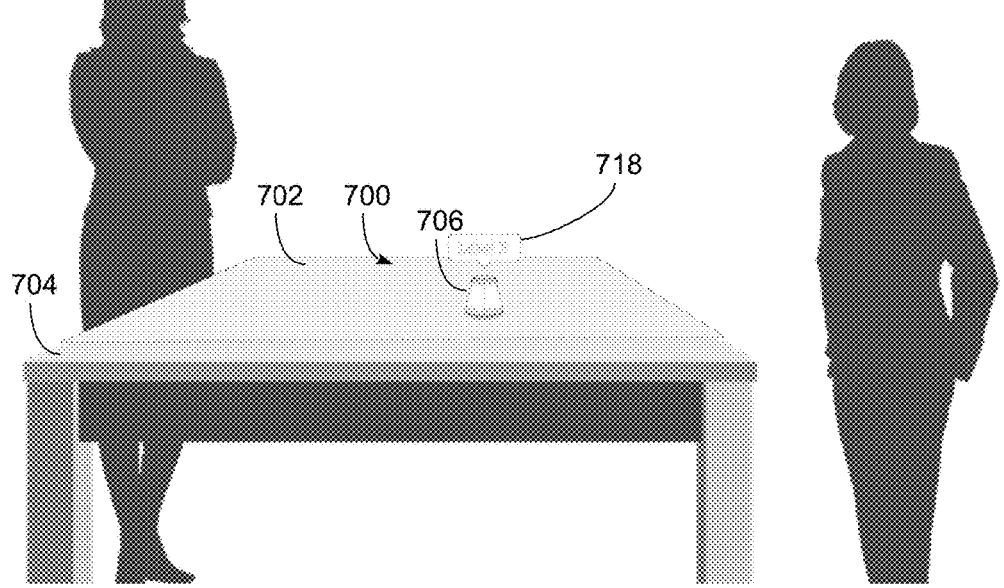
FIGS. 7B-7C illustrate an example volumetric display representation of an oilfield including the well production display representation of FIG. 7A, with a subsurface thereof hidden (FIG. 7B) and shown (FIG. 7C).
Figure 7C:
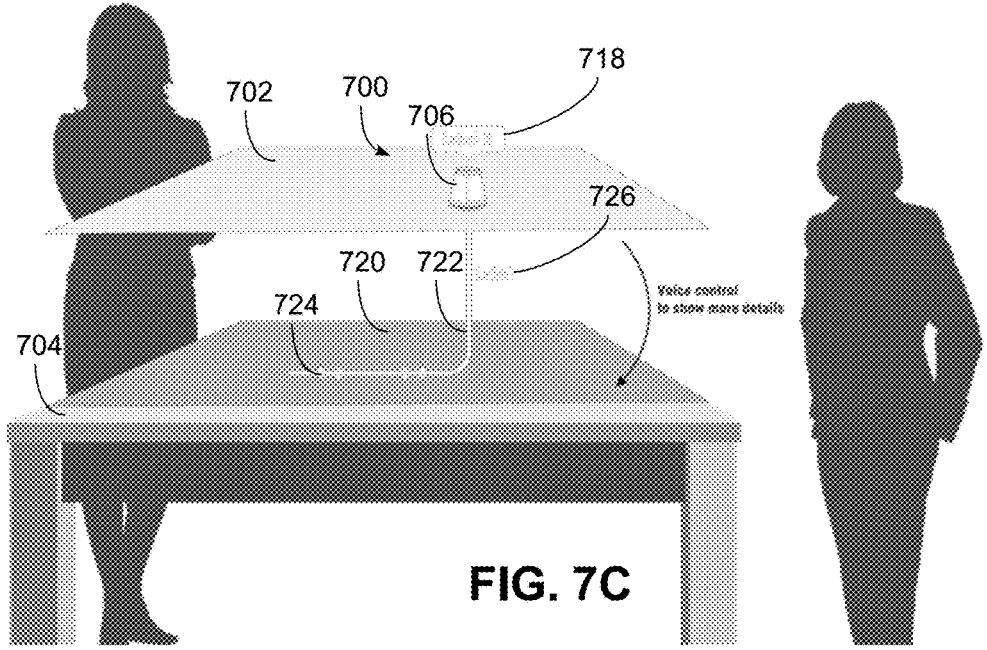

Now turning to FIGS. 7A-7C, these figures illustrate the visualization of a single well 700 in a three-dimensional rendering of an oilfield 702 on a physical tabletop 704 (FIG. 7B). As illustrated in greater detail in FIG. 7A, well 700 may be represented by a volumetric well production display representation 706, which in the illustrated embodiment, includes various display characteristics that represent a wide variety of historical and/or current production data for the given well. In particular, in the illustrated embodiment, display representation 706 generally takes the form of a conical frustum, and may be analogized to a stack of two-dimensional pie graphs representing production over a period of time.

The start of production may be represented by the base of the display representation, while the finish of production, or (for a currently-producing well) the current day, may be represented by the top of the display representation. The height of the display representation, represented by the "H" dimension, may be used to represent the relative length of time that the well has been actively producing, such that taller display representations represent wells that have been in production for longer periods of time than shorter wells. Moreover, the width or diameter of the display representation may be used to represent the relative rate or volume of production of each well, e.g., with the diameter of the base, represented by the "$D_S$" dimension, representing the relative volume of production at the start of production, and the diameter of the top, represented by the "$D_E$" dimension, representing the relative rate or volume of production at the end of production (or at the present time for a still-producing well). Given that well production generally decreases over time, the decreasing width or diameter of the display representation from the base to the top illustrates the rate of production decline of the well, and further a comparison of different display representations may be used to compare the relative rates of production of different wells.

In addition, it will be appreciated that pie graphs are generally used to illustrate the relative percentages of different chemical components of a production fluid recovered from a well, e.g., to illustrate the percentage of oil and water in the fluid recovered from a particular well. As such, display representation 706 may be configured as having different display regions representing different chemical components (e.g., regions 708, 710, which respectively represent oil and water). Viewing the display representation from above (i.e., viewing the top surface of the display representation) may present a representation of a current or last ratio of components, with a similar representation as a two-dimensional pie graph. Moreover, by viewing the profile of the dividing line 712 between regions 708, 710, a change in the relative percentages over time may be discerned. In other embodiments, additional components may be represented as well (e.g., to show oil, gas and water, or to show percentages of different hydrocarbons or hydrocarbon groups, etc.). Each region 708, 710 may be distinguished using different visual representations, e.g., different colors, patterns, shadings, etc.

Additional information may be displayed in connection with an display representation 706, e.g., a start date 714, an end date 716 and/or a label 718 (FIG. 7B), the latter of which may uniquely identify the well. Furthermore, in some embodiments, display representation 706 may be interactive in nature to provide additional information regarding well production. Touching or selecting a point along a side of display representation 706, or speaking or otherwise inputting a date or range of dates, may be used to display production information for a particular date or range of dates, and display representation 706 may be modified accordingly, e.g., to render a portions corresponding to before and/or after a date or range of dates transparent or translucent, to reconfigure the display representation to represent only a range of dates (with the base corresponding to the earliest date and the top corresponding to the latest date), to "split" the display representation into multiple pieces and revel the production data corresponding to the date or range of dates, to display a two-dimensional pie graph representing a given date, or to perform other animations suitable for displaying the production information for a selected date or range.

It will be appreciated that while display representation 706 is illustrated as a conical frustum having a circular base, other shapes may be used in other embodiments, e.g., conical frustums with elliptical bases, or various polygonal frustums having polygon bases such as squares, rectangles, pentagons, etc. In addition, each region of display representation 706 is represented by an arcuate or pie slice-shaped section having a circumference or arc length that varies based upon the relative percentage of the components in the produced fluid (which, as noted above, can also vary over time). However, other manners of illustrating relative percentages of components may also be used in other embodiments, e.g., using linear rather than radial slices such as with stacked bar graphs or area charts, using waffle charts, etc.

In addition, as illustrated in FIG. 7C, via voice control or other suitable user input, a subsurface 720 of oilfield 702 may be displayed to reveal a well trajectory representation 722 for well 700, extending from the base of display representation 706 and representing the actual well trajectory of the well (here, a horizontal well). Additional features of the well, e.g., perforations, completions, ICDs, etc., may be represented by display representations (e.g., display representations 724 for perforations), and additional information regarding the well trajectory or any feature of the well may be retrieved and displayed in response to user interaction with the well trajectory representation 722 or display representation 724, e.g., via a separate display or pop-up proximate the representation or display representation, or in other appropriate manners. In addition, as mentioned above, in some embodiments, an animation may be displayed in some embodiments to raise oilfield 702 off of tabletop 704 such that tabletop 704 represents the elevation of the lowest-most well trajectory in the oilfield.

It will be appreciated that the herein-described techniques may be used to facilitate collaborative viewing and analysis of well production information, e.g., meetings, and may be useful to span the different worlds of production engineering and reservoir engineering.

Additional oilfield entities, e.g., surface facilities, injection wells, pipelines, etc., may also be represented in similar manners within a three-dimensional or four-dimensional environment. In addition, a volumetric representation of the oilfield may also display a seabed and/or various geological features of the subsurface, e.g., faults, layers, reservoir boundaries, targets, While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   generating a volumetric display representation of an oilfield; and
   generating within the volumetric display representation a volumetric well production display representation representing a well in the oilfield, the volumetric well production display representation including a three-dimensional volume rendered in the volumetric display representation and including a plurality of display characteristics configured to display historical production data for the well over a time period, wherein the plurality of display characteristics include a first dimension of the three-dimensional volume representing a duration over which the well is active and a second dimension of the three-dimensional volume representing a rate or volume of production, wherein the second dimension at a predetermined point along the first dimension represents a rate or volume of production for a predetermined time within the duration.

2. The method of claim 1, wherein the plurality of display characteristics further include:
   a plurality of regions representing relative quantities of chemical components in a fluid produced by the well.

3. The method of claim 2, wherein the plurality of regions include regions corresponding to one or more of water, gas, oil, hydrocarbon and hydrocarbon group.

4. The method of claim 2, wherein the plurality of regions are distinguished based upon one or more of color, shading, and pattern.

5. The method of claim 2, wherein the volumetric well production display representation has a conical frustum shape, and wherein each region is generally pie slice-shaped.

6. The method of claim 5, wherein at the predetermined point, each region has an arc length corresponding to a relative quantity of an associated chemical component in a produced fluid produced by the well at the predetermined time.

7. The method of claim 1, wherein the volumetric display representation is interactive and is configured to display additional well production information in response to user input directed to the volumetric display representation.

8. The method of claim 1, further comprising generating within the volumetric display representation a volumetric well trajectory representation corresponding to a well trajectory of the well.

9. The method of claim 8, wherein the volumetric well trajectory representation displays a perforation, completion or inflow control device of the well.

10. The method of claim 8, wherein the volumetric display representation of the oilfield represents a surface, and wherein the volumetric well trajectory representation is displayed below the surface within a subsurface region.

11. The method of claim 8, wherein generating the volumetric well trajectory representation includes generating an animation that elevates the oilfield.

12. The method of claim 8, wherein generating the volumetric well trajectory representation is performed in response to user input to show a subsurface region.

13. The method of claim 12, wherein the user input is a voice input.

14. The method of claim 1, further comprising displaying the volumetric display representation of the oilfield and the volumetric well production display representation with a three-dimensional display, a virtual reality display or an augmented reality display.

15. The method of claim 1, wherein the first dimension is a vertical dimension and the second dimension is a horizontal dimension.

16. A method implemented by one or more processors, the method comprising:
   generating a volumetric display representation of an oilfield, wherein the volumetric display representation of the oilfield represents a surface;
   generating within the volumetric display representation a volumetric well production display representation representing a well in the oilfield, the volumetric well production display representation including a plurality of display characteristics configured to display historical production data for the well over a time period; and
   in response to user input to show a subsurface region, generating an animation that elevates the surface of the oilfield in the volumetric display representation and generates within the volumetric display representation a volumetric well trajectory representation corresponding to a well trajectory of the well and displayed below the surface.

17. An apparatus, comprising:
one or more processors; and
program code configured upon execution by the one or more processors to perform the method of any of claims 1-14.

18. A program product, comprising:
a non-transitory computer readable medium; and
program code stored on the non-transitory computer readable medium and configured upon execution by one or more processors to perform the method of any of claims 1-14.

* * * * *